United States Patent
Komiyama et al.

(10) Patent No.: US 9,481,302 B2
(45) Date of Patent: Nov. 1, 2016

(54) MIRROR FOR CHECKING BLIND SPOT

(75) Inventors: Sakae Komiyama, Kawaguchi (JP); Yoshinori Koyama, Kawaguchi (JP); Hisanaga Takeda, Kawaguchi (JP); Yoshiyuki Iwata, Kawaguchi (JP)

(73) Assignee: Komy Co., Ltd., Kawaguchi-shi (JP)

( * ) Notice: Subject to any disclaimer, the term of this patent is extended or adjusted under 35 U.S.C. 154(b) by 770 days.

(21) Appl. No.: 13/201,678

(22) PCT Filed: Oct. 19, 2010

(86) PCT No.: PCT/JP2010/068338
§ 371 (c)(1),
(2), (4) Date: Aug. 16, 2011

(87) PCT Pub. No.: WO2011/086740
PCT Pub. Date: Jul. 21, 2011

(65) Prior Publication Data
US 2012/0092785 A1    Apr. 19, 2012

(30) Foreign Application Priority Data
Jan. 15, 2010   (JP) ................... 2010-006840

(51) Int. Cl.
G02B 5/08    (2006.01)
G02B 5/26    (2006.01)
B60R 1/04    (2006.01)
B60R 1/08    (2006.01)
G02B 5/09    (2006.01)

(52) U.S. Cl.
CPC ............... B60R 1/04 (2013.01); B60R 1/081 (2013.01); G02B 5/09 (2013.01)

(58) Field of Classification Search
CPC ...... G02B 5/0808; G02B 1/105; G02B 5/08; G02B 5/0858; G02B 5/26; G02B 19/0042; G02B 5/0891; G02B 1/04; G02B 5/0816; G02B 5/201; G02B 1/10; G02B 1/14; G02B 27/0006; G02B 5/008; G02B 5/045; G02B 5/0866; G02B 5/10; G02B 5/208
USPC .................... 359/884, 883, 855, 216
See application file for complete search history.

(56) References Cited

U.S. PATENT DOCUMENTS 3,708,222 A    1/1973   Stern

FOREIGN PATENT DOCUMENTS

| EP | 0 829 738 A2 | 3/1998 |
| JP | 9-267800 | 10/1997 |
| JP | 10-86899 | 4/1998 |
| JP | 10-086899 | * 4/1998 |
| JP | 10-110082 | * 4/1998 |
| JP | 2004-321565 | * 10/2004 |

OTHER PUBLICATIONS

Extended European Search Report issued in EP App. No. 10 84 3095, dated May 24, 2013.

* cited by examiner

*Primary Examiner* — Pascal M Bui Pho
*Assistant Examiner* — Sharrief Broome
(74) *Attorney, Agent, or Firm* — Greer Burns & Crain Ltd.

(57) ABSTRACT

Provided is a mirror for checking blind spot that achieves further thickness reduction while being provided with flame resistance.

A single double-sided adhesive tape 2 in which both surfaces of a base sheet 7 are coated with adhesives 8, 9 is attached to a back surface of a Fresnel mirror 1 formed of a planar transparent resin plate 3. The base sheet 7 is formed of a resin into which a flame retardant is blended.

12 Claims, 4 Drawing Sheets

MIRROR FOR CHECKING BLIND SPOT

This application is a U.S. National Phase under 35 U.S.C. §371 of International Application No. PCT/JP2010/068338, filed Oct. 19, 2010.

TECHNICAL FIELD

The present invention relates to a mirror for checking blind spot, and more specifically a mirror for checking blind spot that achieves further thickness reduction in the case of imparting flame resistance to the mirror.

BACKGROUND ART

Overhead compartments(stowage bins) are arranged above seats or at other similar places in passenger vehicles such as passenger planes. Inside this overhead compartment, there is a blind spot area which is out of the field of view when viewed from below. Because of this, passengers often leave behind their baggage put in the overhead compartment. Patent Document 1 proposes a Fresnel mirror as means for making it easier to find such misplaced baggage. The Fresnel mirror has a convex mirror function and is installed as a mirror for checking blind spot on an inner wall of an overhead compartment. Having a planar shape, this Fresnel mirror has characteristics of securing a wide field of view and eliminating blind spots without occupying a large space.

In the meantime, the mirror attached to a passenger vehicle as described above is obliged to have flame resistance for prevention of fire. Patent Document 2 proposes a mirror for checking blind spot as shown in FIG. 5 for imparting the flame resistance to the mirror.

Specifically, a conventional flame resistive mirror for checking blind spot has a structure in which a metal thin plate 22 serving as flame resistance imparting means is attached to the back surface of a Fresnel mirror 21 as shown in FIG. 5. To be more specific, the metal thin plate 22 is attached to the back surface of the Fresnel mirror 21 with a double-sided adhesive tape 23, a second double-sided adhesive tape 24 is further attached to the back surface of the metal thin plate 22, and this second double-sided adhesive tape 24 is used to attach the conventional mirror for checking blind spot to an attachment target surface such as an inner wall of an overhead compartment. Incidentally, although FIG. 5 shows that components are separated from each other for facilitating the understanding, these components are stacked on each other and bonded together in an actual state.

As described above, the conventional mirror for checking blind spot is formed by use of the two double-sided adhesive tape 23, 24 in addition to the metal thin plate 22. For this reason, the mirror for checking blind spot is thick as a whole, and is placed in a state protruding from the attachment target surface. This poses problems of, for example, not only impairing the outer appearance but also making the mirror for checking blind spot caught with and damaged by baggage when the baggage is taken in and out of the overhead compartment. In addition, this structure is an obstacle to weight reduction for the case of mirrors for checking blind spot for passenger planes.

PRIOR ART DOCUMENT

Patent Document

Patent Document 1: Japanese patent application Kokai publication No. Hei 9-267800
Patent Document 2: Japanese patent application Kokai publication No. Hei 10-86899

SUMMARY OF THE INVENTION

Problem to be Solved by the Invention

An objective of the present invention is to solve the aforementioned conventional problems and to provide a mirror for checking blind spot that achieves further thickness reduction in the case of imparting flame resistance to the mirror.

Means for Solving the Problem

A mirror for checking blind spot of the present invention that achieves the above objective is characterized in that a single double-sided adhesive tape in which both surfaces of a base sheet are coated with adhesives is attached to a back surface of a Fresnel mirror formed of a planar transparent resin plate, and that the base sheet is formed of a resin into which a flame retardant is blended.

It is more preferable to use a foamed resin as a resin forming the base sheet of the double-sided adhesive tape, and to use any one of an acrylic resin and a urethane resin as a material for the foamed resin.

At least one selected from the group consisting of Pentabromodihpenyl ether, Octabromodiphenyl ether, Decabromodiphenyl ether, Tetrabromodiphenyl ether A, and Hexabromocyclododecane, Triphenyl phosphate, chlorinated paraffins, antimony trioxide, antimony pentoxide, aluminum hydroxide, and magnesium hydroxide is preferably used as the flame retardant blended into the resin.

The transparent resin plate may have a thickness of 0.1 mm to 2.0 mm, and the double-sided adhesive tape may have a thickness of 0.1 mm to 1.5 mm. The double-sided adhesive tape has a thickness of 0.1 mm to 1.0 mm, and the double-sided adhesive tape can employ a specification in which an adhesive on an opposite side from an adhesive attached to the back surface of the Fresnel mirror has a larger layer thickness than the adhesive attached to the back surface of the Fresnel mirror.

Effects of the Invention

The mirror for checking blind spot of the present invention has a structure where the single double-sided adhesive tape is attached to the back surface of the Fresnel mirror formed of the transparent resin plate, and where the base sheet of the double-sided adhesive tape is formed of the resin into which the flame retardant is blended. With this structure, the mirror has the flame resistance alternative to the conventional metal thin plate, and achieves much larger thickness reduction than the conventional mirror for a passenger plane in which a three-layer structure is attached. Moreover, this thickness reduction of the mirror for checking blind spot allows weight reduction, and has such an improved flexibility that the mirror can thoroughly follow an attachment target surface having a curved surface and thereby can be attached thereto in a better condition.

MODES FOR CARRYING OUT THE INVENTION

Figure 1:
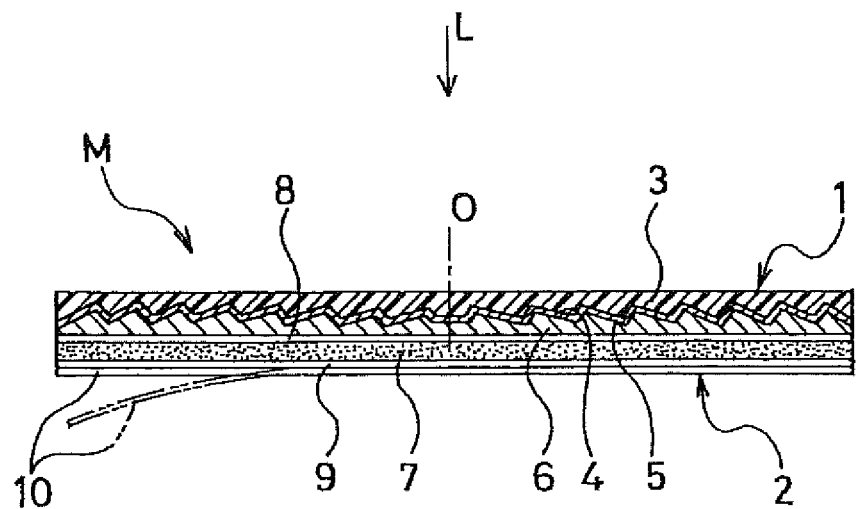
FIG. 1 is a schematic longitudinal sectional view of a mirror for checking blind spot according to an embodiment of the present invention.
Figure 2:
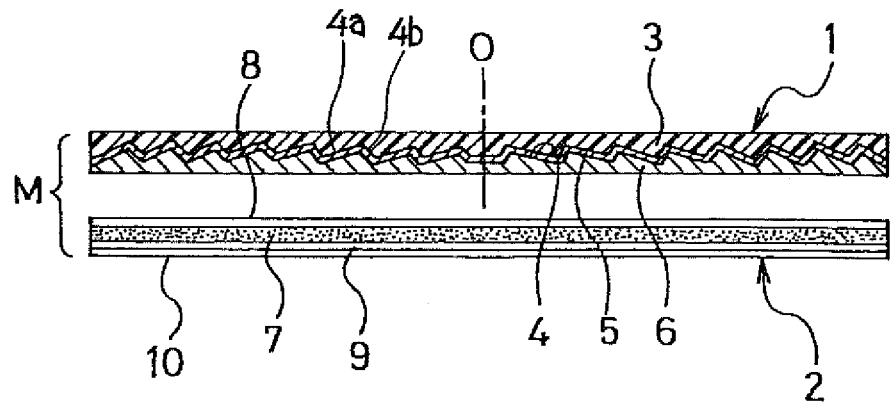
FIG. 2 is an explanatory view showing the mirror for checking blind spot in FIG. 1 with its components separated from each other.

FIGS. 1 and 2 show a mirror for checking blind spot according to an embodiment of the present invention. Of these drawings, FIG. 2 shows that components are separated from each other.

In FIGS. 1 and 2, M denotes the mirror for checking blind spot, 1 denotes a planar Fresnel mirror having a convex mirror function, and 2 denotes a double-sided adhesive tape. The mirror M for checking blind spot is formed in a state in which only the single double-sided adhesive tape 2 is attached to a back surface of the Fresnel mirror 1.

In the Fresnel mirror 1, a large number of annular grooves 4 each having a V-shaped cross section are formed on a back surface side of a transparent resin plate 3. Each of the annular grooves 4 includes an inclined area 4a and a step area 4b with which the inclined areas 4a adjacent to each other are coupled to each other. These numerous annular grooves 4 are arranged concentrically about a center O in order of diameter. A surface of the annular grooves 4 is coated with a reflection film 5 made of a metal such as aluminum by deposition or plating, and a surface of the reflection film 5 is also coated with a protection layer 6 made of a resin such as a coating.

In the numerous annular grooves 4 having different diameters, the inclination angles which their groove bottoms (inclined areas 4a) form with respect to a planar direction of the resin plate 3 sequentially change so that the groove bottom (inclined area 4a) of an annular groove 4 located farther from the center O can have a larger inclination angle. To put it another way, the inclination angles of the reflection film 5 coating the groove bottoms (inclined areas 4a) sequentially change so that the reflection film 5 located father from the center O can have a larger inclination angle. With this change in the inclination angles of the reflection film 5 on the groove bottoms (inclined areas 4a) of the annular grooves 4, the Fresnel mirror 1 functions as a convex mirror for light L entering the Fresnel mirror 1 from its surface side.

The double-sided adhesive tape 2 has a structure in which adhesives 8, 9 are applied in a film-like manner to both surfaces of a base sheet 7. Among these, the base sheet 7 is made of a resin into which a flame retardant is blended. The base sheet 7 can be made by use of either of a foamed resin and a non-foamed resin. Since the base sheet 7 contains the flame retardant, the flame resistance is imparted to the mirror M for checking blind spot. Of the adhesives 8, 9 on both the surfaces, the adhesive 8 is means for attaching the base sheet to the Fresnel mirror 1, and the adhesive 9 is means for attaching the mirror M for checking blind spot to an attachment target surface such as an inner wall of an overhead compartment. An outer surface of the adhesive 9 is coated with release paper 10. This release paper 10 is removed to attach the mirror M for checking blind spot to an attachment target surface such as a wall.

The aforementioned mirror M for checking blind spot has the structure in which only the single double-sided adhesive tape 2 is attached to the back surface of the Fresnel mirror 1, and in which the base sheet 7 is made of the resin into which the flame retardant is blended. Instead of the conventional metal thin plate, this flame retardant base sheet 7 can impart the flame resistance to the mirror M for checking blind spot. In addition, since only the single double-sided adhesive tape 2 is provided, the whole thickness of the mirror can be reduced by 50% or more from the conventional mirror for checking blind spot in which a three-layer structure is attached. Moreover, this thickness reduction can lead to further weight reduction of the mirror M for checking blind spot as a whole. The thickness of the double-sided adhesive tape 2 excluding the release paper is set to, for example, approximately 0.01 mm to 1.50 mm, or more preferably of approximately 0.1 mm to 1.0 mm. Further, if the Fresnel mirror 1 is also formed with thickness reduction, the mirror M for checking blind spot achieves further thickness reduction as a whole, and thus is made flexible. Hence, the mirror M for checking blind spot can be attached in a better condition by easily following an inner wall having a curved surface.

In the present invention, resins such as polycarbonate, polyacrylic, and polystyrene resins can be preferably used for a material for the transparent resin plate 3 forming the Fresnel mirror 1. The polycarbonate, in particular, has high anti-shock properties to exert excellent durability. The transparent resin plate 3 may be made as thin as possible but thick enough to form the annular grooves 4, and is formed to have a thickness on the order of 0.1 mm to 2.0 mm. The resin plate 3 may be formed in a film form having a thickness of 0.5 mm or less preferably, or 0.4 mm or less more preferably. In combination of use of only the single double-sided adhesive tape 2, this thickness reduction of the transparent resin plate 3 can contribute to the further thickness reduction of the whole mirror M.

The transparent resin plate 3 formed to have a thickness of 0.1 mm to 0.5 mm or less is advantageous for preventing the spread of fire. This is because even if the Fresnel mirror 1 is burned, the Fresnel mirror 1 is burned out to vanish instantly, which in turn makes the fire unlikely to spread to peripheral components. For this reason, if the total thickness of the Fresnel mirror 1 and the double-sided adhesive tape 2 excluding the release paper 10 is set to approximately 0.2 mm to 1.5 mm, the mirror M for checking blind spot is even less likely to be caught with baggage or the like and also benefits from great improvement in flame resistance.

In the case where an attachment target surface such as a wall is rough, the thickness reduction of the double-sided adhesive tape 2 (base sheet 7) makes it more difficult to cause the base sheet 7 to follow the attachment target surface since the base sheet 7 itself cannot be expected to deform in a thickness direction thereof. In this case, a stable adhesive power can be more easily secured if the layer of the adhesive 9 is provided with a larger thickness to absorb the roughness of the attachment target surface. The layer thickness increase of the adhesive 9, however, leads to a thickness increase of the double-sided adhesive tape 2. Meanwhile, the back surface of the Fresnel mirror 1 can be made flat and smooth to a certain extent. Thus, the adhesive 8 attached to the back surface of the Fresnel mirror 1 can surely exert a stable adhesive power even though the layer thickness of the adhesive 8 is not very large. Accordingly, when the thickness of the double-sided adhesive tape 2 excluding the release paper 10 is made as small as 0.1 mm to 1.0 mm, the layer thickness of the adhesive 9 on the attachment target surface side (the release paper 10 side) may be set larger than the layer thickness of the adhesive 8 attached to the back surface of the Fresnel mirror 1.

An arrangement pitch of the numerous annular grooves 4 formed in the transparent resin plate 3 can be 0.01 to 0.2 mm, and may be more preferentially 0.01 to 0.1 mm. With the employment of such a fine arrangement pitch, an image formed by the Fresnel mirror 1 can be further sharpened. As a metal for the reflection film coating the annular grooves 4, aluminum is preferable and can be formed in a film form by deposition or plating.

In the present invention, only the single double-sided adhesive tape is attached to the Fresnel mirror 1. The base sheet 7 of the double-sided adhesive tape 2 is formed of a resin into which the flame retardant is blended. This blending of the flame retardant can impart the flame resistance to the mirror M for checking blind spot without using any metal thin plate.

The flame retardant blended into the resign for the base sheet is not particularly limited, and usable flame retardants are phosphorus-based, nitrogen-based, and halogen-based flame retardants, blends of phosphorus-based and nitrogen-based flame retardants, blends of phosphorus-based and halogen-based flame retardants, boron compounds, antimony trioxides, aluminum hydroxide, vinyl compounds, oxide compounds, hydroxide compound, epoxy compound and the like. Examples of organic flame retardants are bromine compounds such as Pentabromodihpenyl ether, Octabromodiphenyl ether, Decabromodiphenyl ether, Tetrabromodiphenyl ether A, and Hexabromocyclododecane; phosphorous compounds such as Triphenyl phosphate; chlorine compounds such as chlorinated paraffins; and the like. In addition, examples of inorganic flame retardants are antimony compounds such as antimony trioxide and antimony pentoxide; metal hydroxides such as aluminum hydroxide and magnesium hydroxide; and the like. These flame retardants may be used solely or in combination of two or more of them.

The resin forming the base sheet 7 is preferably a flexible resin. A foamed resin which is foamed by a foaming agent is particularly preferable. When the foamed resin is used, the mirror M for checking blind spot can be attached to an attachment target surface in a better condition. Even when an inner wall of an overhead compartment or the like has a curved surface, for example, the adhesion stability of the mirror M for checking blind spot can be improved since the resin allows the mirror M for checking blind spot to flexibly follow the curved surface. Kinds of resins are not particularly limited, but an acrylic resin or a urethane resin is preferable.

The adhesive of the double-sided adhesive tape 2 on the opposite side from the Fresnel mirror 1 is coated with the release paper 10, but the release paper 10 is not always needed. This release paper 10 is for protecting the mirror M for checking blind spot from sticking to another object in a retention period before the attachment of the mirror M for checking blind spot to an attachment target surface, and is stripped and removed in the process of attaching the mirror M for checking blind spot to the attachment target surface.

Figure 3:
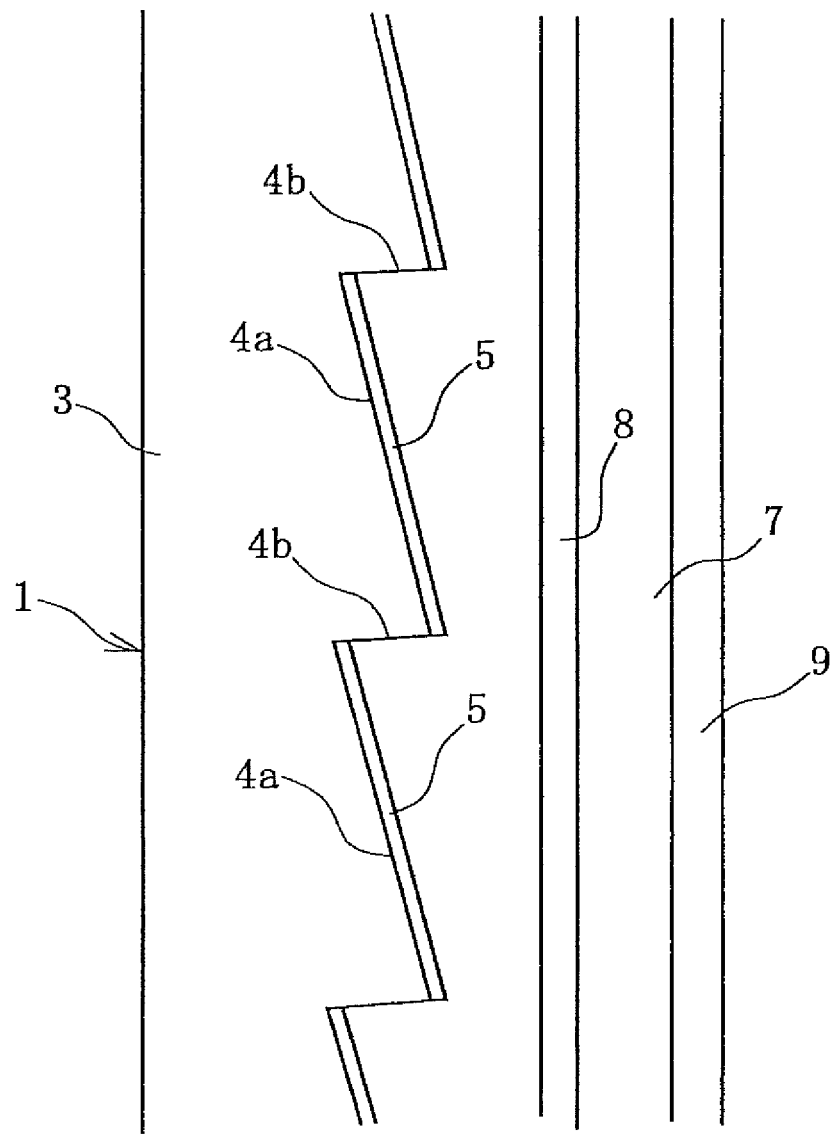
FIG. 3 is a sectional view of a modified example of the mirror for checking blind spot of the present invention.

FIG. 3 shows a modified example of the mirror M for checking blind spot of the present invention. In this modified example, a transparent resin plate in each of annular grooves 4 formed on the transparent resin plate, the surface of the inclined area 4a is coated with a reflection film 5 whereas the surface of the step area 5b is not coated with the reflection film 5. In summary, the annular groove 4 has a structure in which only the surface of the inclined area 4a is coated with the reflection film 5.

Figure 4:
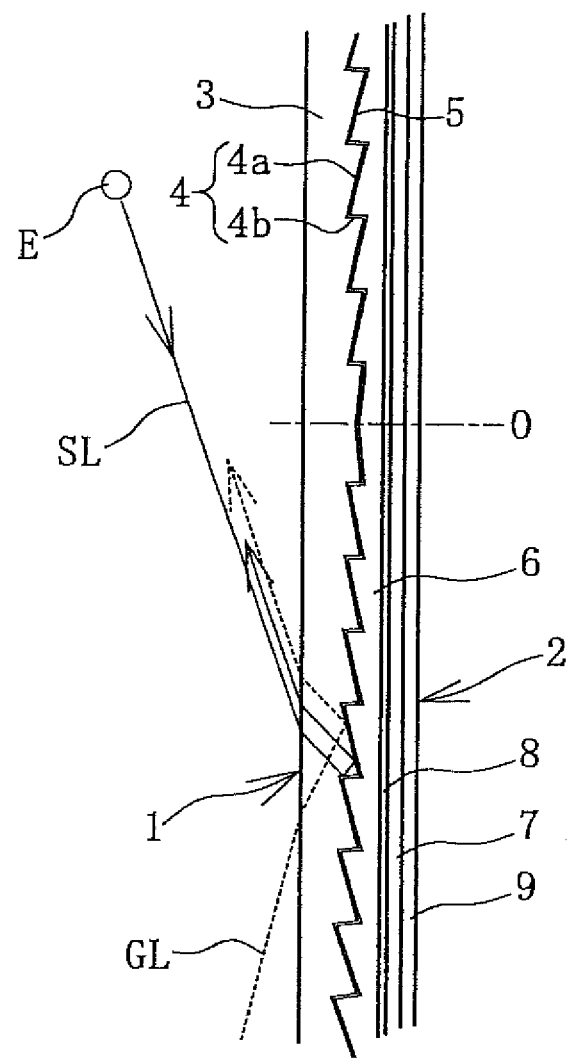
FIG. 4 is an explanatory view of a glaring phenomenon occurring in a Fresnel mirror.
Figure 5:
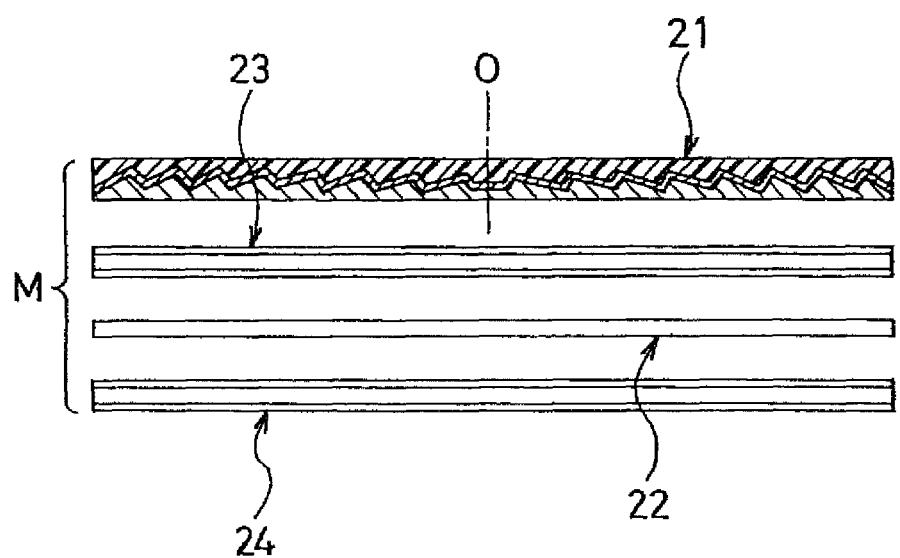
FIG. 5 is a schematic longitudinal sectional view showing a conventional mirror for checking blind spot with its components separated from each other.

Here, let's suppose a case where the surface of the inclined areas 4a and the step areas 4b is coated with the reflection film 5 and where sunlight SL falls onto the surface of the Fresnel mirror 1 at a relatively small angle. In this case, there occurs a phenomenon in which: part of the light travelling inside the transparent resin plate 3 falls onto and is reflected by the step area 4b as shown in FIG. 4; the reflected light is further reflected by the inclined area 4a and is returned again in the incident direction from which the sunlight SL firstly comes; and the sunlight SL returned in the incident direction acts as a glare which directly enters human eyes E. This makes it difficult to see image light GL which is shown by a dashed line and enters the Fresnel mirror 1 in an opposite direction from the incident direction of the sunlight SL. To be more specific, the glare makes the imaging light GL clouded in white.

In the structure shown in FIG. 3, in contrast, light falin onto the step area 4b of the annular groove 4 is not reflected but absorbed by the step area 4b. Hence, the glaring phenomenon does not occur, and therefore an image shown on the Fresnel mirror 1 can be viewed more clearly.

The mirror M for checking blind spot of the present invention is provided to a vehicle such as a passenger plane, a passenger train or a passenger bus and is usable for checking blind spots at an inner wall of an overhead compartment, a wall of a passenger cabin or the like. The mirror M for checking blind spot is particularly preferable for an inner wall of an overhead compartment. In addition, the mirror M for checking blind spot can be used for preventing misplacement in an overhead compartment provided, not only in a vehicle, but also in a guest room of a hotel or the like

EXPLANATION OF REFERENCE NUMERALS

M mirror for checking blind spot
1 Fresnel mirror
2 double-sided adhesive tape
3 transparent resin plate
4 annular groove
4a inclined area
4b step area
5 reflection film
6 protection layer
7 base sheet
8, 9 adhesive
10 release paper

What is claimed is:
1. A mirror for checking blind spot, comprising:
a single double-sided adhesive tape having a base sheet with a first surface and a second surface opposite the first surface, the first and the second surfaces being coated with adhesives, wherein the first surface is attached directly to a back surface of a Fresnel mirror formed of a planar transparent resin plate and the second surface is adapted to be attached directly to a generally planar surface for supporting the mirror thereon,
wherein the base sheet is formed of a resin into which a flame retardant chemical compound is blended,
the transparent resin plate has a thickness of 0.1 mm to 2.0 mm, and
the double-sided adhesive tape has a thickness of 0.1 mm to 1.5 mm.

2. The mirror for checking blind spot according to claim 1, wherein
the double-sided adhesive tape has a thickness of 0.1 mm to 1.0 mm, and
in the double-sided adhesive tape, an adhesive on an opposite side from an adhesive attached to the back surface of the Fresnel mirror has a larger layer thickness than the adhesive attached to the back surface of the Fresnel mirror.

3. The mirror for checking blind spot according to claim 1, wherein
a large number of annular grooves having different diameters are arranged concentrically in the back surface of the transparent resin plate,
a surface of the annular grooves is coated with a reflection film,
a surface of the reflection film is coated with a protection layer,
each of the annular grooves includes an inclined area and a step area with which inclined areas adjacent to each other are coupled to each other, and
in each of the annular grooves, only a surface of the inclined area is coated with the reflection film.

4. The mirror for checking blind spot according to claim 2, wherein
a large number of annular grooves having different diameters are arranged concentrically in the back surface of the transparent resin plate,
a surface of the annular grooves is coated with a reflection film,
a surface of the reflection film is coated with a protection layer,
each of the annular grooves includes an inclined area and a step area with which inclined areas adjacent to each other are coupled to each other, and
in each of the annular grooves, only a surface of the inclined area is coated with the reflection film.

5. The mirror for checking blind spot according to claim 1, wherein
the mirror is attached to an inner wall of an overhead compartment in any one of a passenger plane, a passenger train, and a passenger bus.

6. The mirror for checking blind spot according to claim 2, wherein
the mirror is attached to an inner wall of an overhead compartment in any one of a passenger plane, a passenger train, and a passenger bus.

7. The mirror for checking blind spot according to claim 1, wherein a resin forming the base sheet is a foamed resin.

8. The mirror for checking blind spot according to claim 2, wherein a resin forming the base sheet is a foamed resin.

9. The mirror for checking blind spot according to claim 7, wherein the foamed resin is any one of an acrylic resin and a urethane resin.

10. The mirror for checking blind spot according to claim 8, wherein the foamed resin is any one of an acrylic resin and a urethane resin.

11. The mirror for checking blind spot according to claim 1, wherein
the flame retardant chemical compound is at least one selected from the group consisting of Pentabromodiphenyl ether, Octabromodiphenyl ether, Decabromodiphenyl ether, Tetrabromodiphenyl ether A, and Hexabromocyclododecane, Triphenyl phosphate, chlorinated paraffins, antimony trioxide, antimony pentoxide, aluminum hydroxide, and magnesium hydroxide.

12. The mirror for checking blind spot according to claim 2, wherein
the flame retardant chemical compound is at least one selected from the group consisting of Pentabromodiphenyl ether, Octabromodiphenyl ether, Decabromodiphenyl ether, Tetrabromodiphenyl ether A, and Hexabromocyclododecane, Triphenyl phosphate, chlorinated paraffins, antimony trioxide, antimony pentoxide, aluminum hydroxide, and magnesium hydroxide.

* * * * *